United States Patent [19]

Eckert et al.

[11] 4,071,194

[45] Jan. 31, 1978

[54] MEANS FOR COOLING EXHAUST NOZZLE SIDEWALLS

[75] Inventors: Terry T. Eckert, Fairfield, Ohio; Edward C. McDonough, Lawrenceburg, Ind.

[73] Assignee: The United States of America as represented by the Secretary of the Navy, Washington, D.C.

[21] Appl. No.: 736,299

[22] Filed: Oct. 28, 1976

[51] Int. Cl.² .............................................. B64D 33/08
[52] U.S. Cl. ................................ 239/127.3; 239/397.5; 244/117 A
[58] Field of Search ................... 239/127.1, 127.3, 128, 239/132–132.5, 397.5; 244/117 A, 207; 60/265–267

[56] References Cited

U.S. PATENT DOCUMENTS

| 2,935,841 | 5/1960 | Myers et al. | 239/127.1 |
| 3,099,909 | 8/1963 | Newcomb | 239/127.1 |
| 3,210,933 | 10/1965 | Crews et al. | 239/132.3 X |
| 3,374,954 | 3/1968 | Card | 239/127.1 |
| 3,507,449 | 4/1970 | Butter | 239/127.1 |
| 3,695,515 | 10/1972 | Stockel | 239/127.1 |
| 3,972,475 | 8/1976 | Nelson et al. | 239/127.3 |
| 3,981,448 | 9/1976 | Demogenes et al. | 239/127.3 |

FOREIGN PATENT DOCUMENTS

| 1,109,824 | 4/1968 | United Kingdom | 244/117 A |

Primary Examiner—Evon C. Blunk
Assistant Examiner—Andres Kashnikow
Attorney, Agent, or Firm—R. S. Sciascia; L. I. Shrago; C. E. Vautrain, Jr.

[57] ABSTRACT

A cooling arrangement for a gas turbine exhaust nozzle is provided which includes a plurality of heat shield panels slidably positioned on tracks mounted on the nozzle casing. The panels are spaced apart to permit thermal expansion and include impingement baffles which are attached thereto intermediate the panels and the casing. Holes in the impingement baffles direct cooling air against the interior surface of the panels. The cooling air is directed by suitable means such as slots or film holes to form a film of cooling air along the surface of the panels exposed to hot gases.

9 Claims, 5 Drawing Figures

MEANS FOR COOLING EXHAUST NOZZLE SIDEWALLS

The present invention concerns cooling exhaust nozzles of gas turbine engines and other such devices and, more particularly, means for accomplishing such cooling which avoids warping and distortion due to thermally induced stresses without requiring large quantities of cooling air.

In the development of high thrust engines, there has always existed the serious problem of protecting the load-carrying structure as well as possible from the extremely high temperatures to which it is subjected by the hot gases of the thrust chamber. Some of the prior protective arrangements weaken the structure or add greatly to its weight or are wasteful of a coolant required to achieve desired cooling, among other deficiencies. In the exhaust nozzle of a gas turbine engine such as those used in Vertical Take-Off and Landing (VTOL) aircraft where hot gas temperatures are on the order of 3,000° F, it is particularly necessary to cool the associated components to an allowable temperature.

Most exhaust nozzles are provided with a liner whose function is to produce a film of cooling air to protect the nozzle flowpath components from the hot exhaust gases. While this approach maintains allowable metal temperatures, large quantities of cooling air are required which reduce its efficiency. Another problem with this type of liner is the warping and other distortion that occur due to thermally induced stresses resulting from attaching a hot liner to a cooled casing. This distortion causes variations in the cooling effectiveness and the warped surfaces decrease the sealing efficiency. The present invention overcomes these and other deficiencies of prior attempts to solve the problem by utilizing means which operate to combine impingement and film cooling.

Accordingly, it is an object of the present invention to provide the efficient cooling of gas turbine or other high temperature engine exhaust nozzles which avoids warping, distortion and excessive use of a cooling medium.

Another object of this invention is to provide for efficient cooling of such exhaust nozzles by low cost replaceable components.

A further object of this invention is to provide for efficient cooling of such nozzles wherein distortion is avoided and wearing of the seals by gases is obviated.

Other objects, advantages and novel features of the invention will become apparent from the following detailed description thereof when considered in conjunction with the accompanying drawings in which like numerals represent like parts throughout and wherein.

The present invention provides, in general, for exhaust nozzle cooling by slidably positioning a plurality of impingement-and film-cooled strips or panels intermediate the nozzle casing and the hot gases, with means provided for permitting expansion of the panels both longitudinally and laterally. This expansion closes a cold gap during operation of the nozzle, with the panels remaining substantially undistorted or flat thereby providing efficient sealing surfaces during periods of operation in which exceedingly high gas temperatures are encountered.

Figure 1:
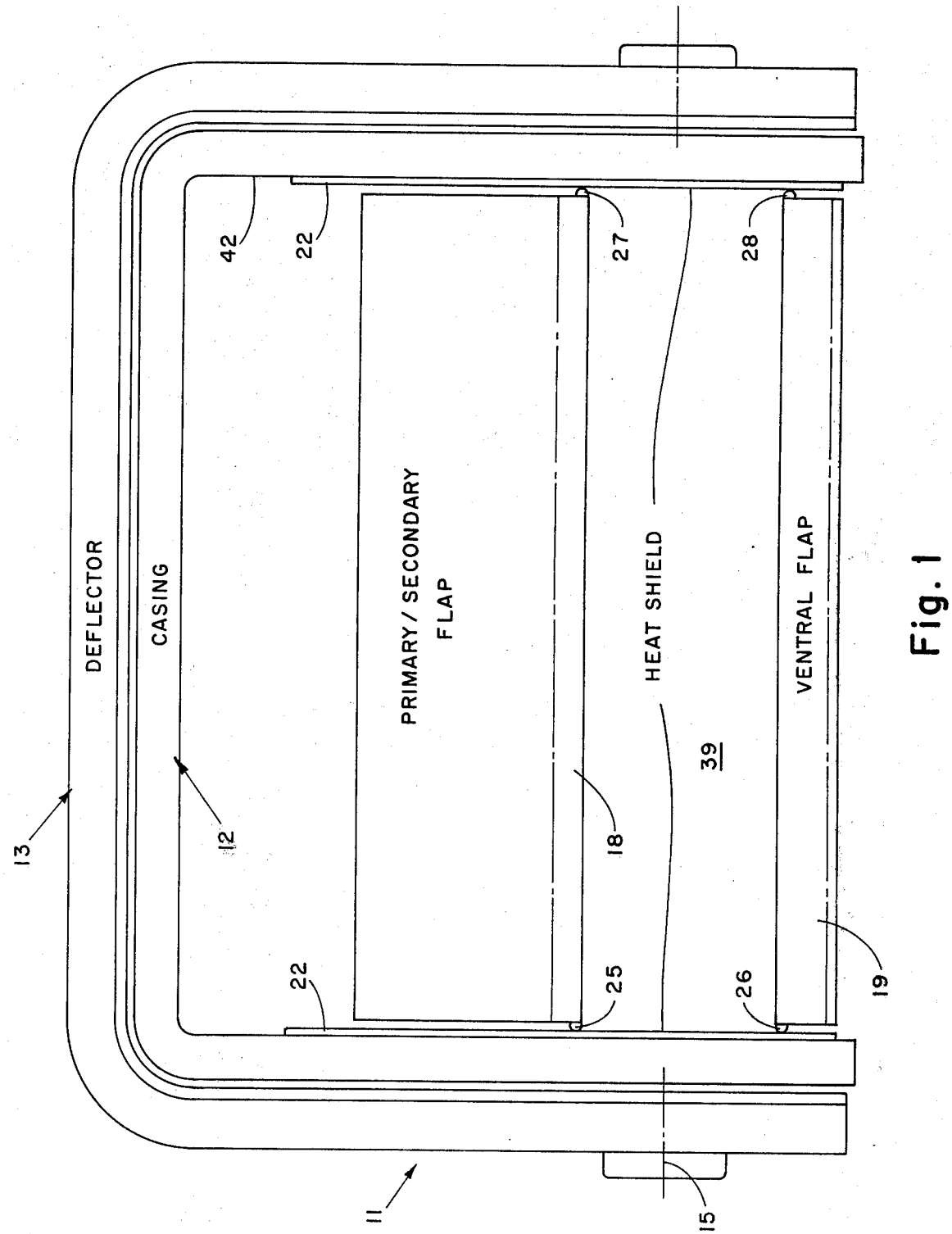
FIG. 1 is an end view of an augmented deflector exhaust nozzle showing flowpath routes and the position of the cooling means of the present invention.

Referring to the drawings, FIG. 1 shows the outline of an exhaust nozzle 11 for a gas turbine engine in which an inner casing 12 is fixed at all times while an outer deflector 13 is pivotable about an axis 15 to augment lift forces during, in this particular embodiment, vertical take-off of the craft on which this nozzle is mounted. A primary/secondary or converging/diverging flap 18 and a ventral flap 19 are pivotably mounted within casing 12 and are actuated when augmented thrust is desired. A protective barrier 22 is positioned on the inner wall of casing 12 to protect the casing from exceedingly hot gases which are forced through the nozzle during the augmented thrust phase of operation of the gas turbine engine. Flaps 18 and 19 are spaced from protective barrier 22 by a plurality of telescoping seals 25-28. These flaps are illustrated and described more fully in U.S. Pat. No. 3,979,067 issued Sept. 7, 1976.

Figure 2:
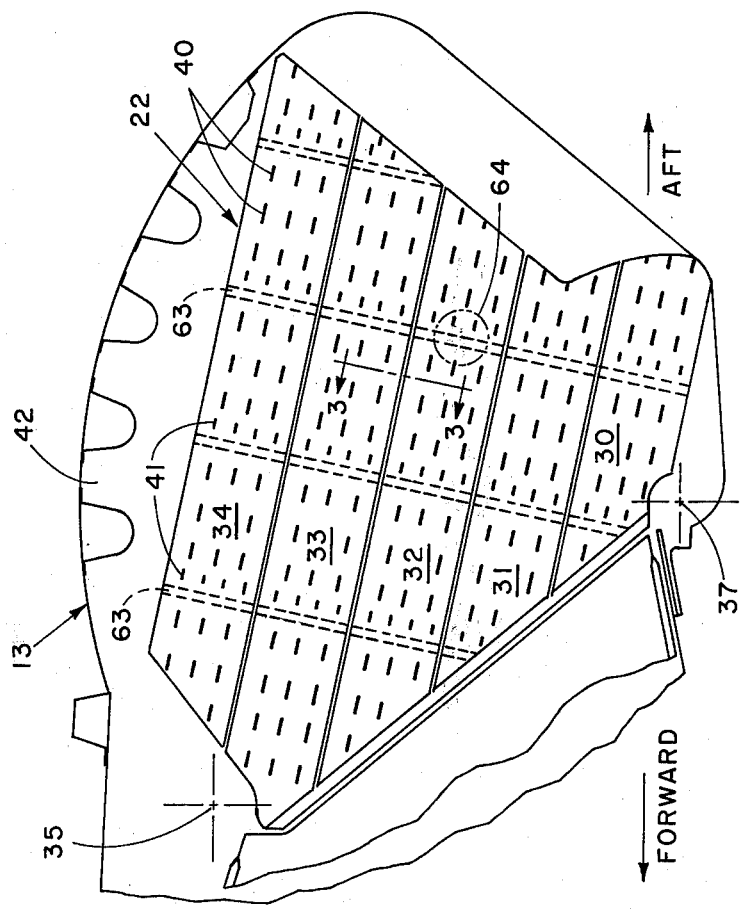
FIG. 2 is a side elevation of the cooling means shown in FIG. 1.
Figure 3:
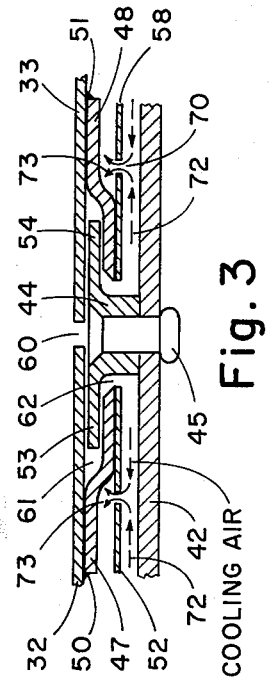
FIG. 3 is a sectional view of a portion of the cooling means of FIG. 2 taken along a line substantially corresponding to line 3—3 therein.

In FIG. 2, the interior face of protective barrier 22 is shown which comprises a plurality of heat shielding strips or panels 30-34 covering a selected area of the casing wall. Panels 30-34 preferably have a uniform width and vary in length and end configuration as indicated to define the edges of the area to be protected in conformance with the nozzle structure. Primary/secondary flap 18 pivots about an axis indicated at 35 while ventral flap 19 pivots about an axis indicated at 37. These flaps, when actuated, force the engine gases between them, i.e. through the area indicated at 39 in FIG. 1. Panels 30-34 are spaced from one another on both continuous sides so as to allow for both longitudinal and transverse expansion during extreme heating conditions. The panels have a plurality of openings 40 and 41 formed in them, which may be either slots or holes, for selectively releasing coolant such as cool air along the surface of the heat shield. Panels 30-34 are mounted on the inner wall of casing 12 as indicated at 42 and as shown in FIG. 3 which is a sectional view taken along line 3—3 in FIG. 2. A plurality of tracks 44 for supporting the panels are riveted to the casing by a plurality of rivets 45 or are otherwise attached to the casing. All panels are uniform in width so that they may be readily mounted on tracks 44 which are uniformly spaced across the area desired to be protected. The panels are slidably mounted on the tracks and include a plurality of straps 47, 48 which are welded or otherwise attached thereto along their outer edges parallel to the tracks as indicated at 50 and 51 and are reverse folded substantially along their longitudinal centerline to form a slot for receiving a pair of outwardly extending portions 53 and 54 of track 45 in a slidable close fit. An impingement baffle 52, 58 is welded or otherwise secured to each strap portion to form with the respective panel a plurality of plenums of cooling air. Individual panels and their straps and baffles move as a unit independently of other panels. The panels, straps and tracks are spaced from one another as indicated at 60, 61 and 62, respectively, to accommodate any anticipated transverse expansion thereof. Panels 30-34 are positioned by sliding them over the respective tracks from the aft end of the nozzle and, after adjustment to the precise position, are anchored to the casing at the forward end of each panel by conventional removeable attachment means. The panels are divided longitudinally into the plurality of plenums by a similar plurality of dams 63 which are welded or otherwise secured to the interior surface of the panels and rest upon the respective baffles. Anchoring the panels and baffles in this manner permits growth aft longitudinally as well as transversely between one panel strip and the adjoining ones, unrestrained, by sliding on the tracks. This freedom of growth avoids warping and other distortions caused by excessively high temperatures and also closes gap 60 during operation at such temperatures.

Figure 5:
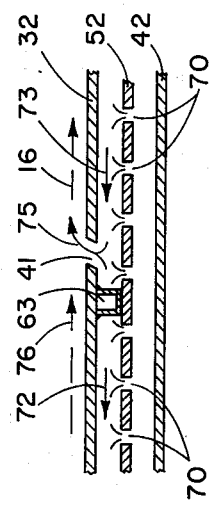
FIG. 5 is a sectional view of the enlarged view of FIG. 4 taken along a line substantially corresponding to line 5—5 therein.
Figure 4:
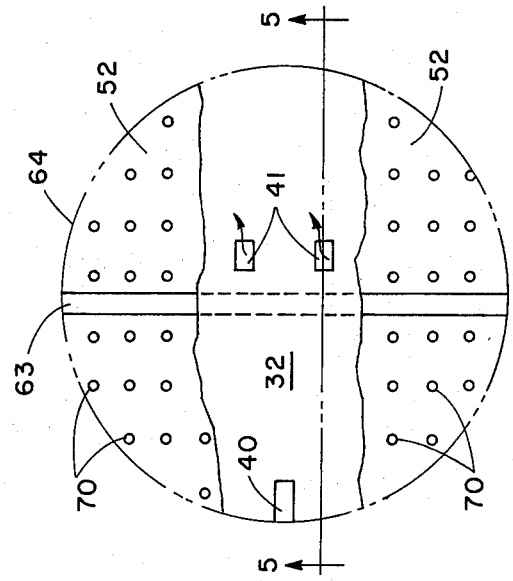
FIG. 4 is an enlarged view of a portion of the heat shield shown in FIG. 2 partially cut away to illustrate the plenums for diverting cooling air out through the heat shield.

FIG. 4 is an enlarged view of a portion of panel 32. Each panel is divided by dams 63 into a plurality of plenums as required by the varying gas side pressure distribution. As seen in FIG. 5, a plurality of holes or orifices 70 are formed in each of the baffles to allow cooling air to pass therethrough and impinge upon and flow along the undersurface of panels 30-34.

In operation, cooling of the heat shield panels 30-34 is effected by the cooler air existing in the space between the casing and the impingement baffles being forced or injected through orifices 70 into the individual plenums created by dams 63 as indicated by arrows 72 and 73 in the form of cooling air jets which impinge upon and then flow along heat shield panels 30-34. Further cooling is achieved as the cooling air exits through holes or slots 41 as indicated by arrow 75, producing a cooled boundary layer along the surface of the panels exposed to exhaust gases as indicated by arrows 76. Dams 63 serve to both divide the cooling air area into a selected number of small plenums and to space the panels from the baffles.

The means for cooling the sidewalls of nozzles provided by the present invention is superior to conventional liner-cooled nozzles in, among other distinctions, preventing thermal distortion by covering the sidewalls with narrow panel strips and avoiding excessive waste of cooling air supplied from an outside source. Precooled air may be injected into the space between casing 42 and the impingement baffles to provide more rapid cooling of the nozzle sidewalls. By remaining undistorted or substantially flat, the heat shield panels provide an efficient sealing surface for the telescoping flap seals. This permits the seals to operate effectively and also prevents wear of the casing from seal rubs. The heat shield panels are easily replaced for maintainence, and are low in cost because of their identical width and long lengths which may be readily cut to the required dimensions. It will be appreciated that the protection afforded by the heat shield panels of the present invention may be applied to many surfaces other than those in gas turbine engine nozzles within the concept of the invention. Obviously, many modifications and variations of the invention are possible in the light of the above teachings.

What is claimed is:

1. An exhaust nozzle sidewall heat shield and cooling means comprising:

spaced heat shield means positioned over the nozzle sidewall portion exposed to high temperature gases;

means included in said heat shield means for directing cooling air from areas in register with the sidewall portion to opposed surfaces of said heat shield means exposed to high temperature gases; and means secured to said nozzle and slidably receiving said heat shield means, said heat shield means exposed to high temperature exhaust gases secured to said nozzle at the forward end and allowed to expand longitudinally and transversely therefrom so as to avoid warping and distortion due to changing temperatures of the exhaust gases.

2. The cooling means of claim 1 wherein said heat shield means include a plurality of panels slidably disposed across the sidewall portion, a like plurality of baffles secured to said panels and disposed intermediate said panels and the nozzle sidewall slidable with said panels, means securing together respective panels and baffles, said means secured to said nozzle including means anchored to said sidewall and adapted to slidably receive and retain edge portions of said panels and said securing means.

3. The cooling means of claim 2 wherein said means for directing cooling air are openings in said baffles and said panels allowing cooling air to pass from the area adjacent said sidewall portion through said baffles and thence through said panels;

means dividing the space between said baffles and said panels into a plurality of plenums, said dividing means secured to said panels and abutting said baffles, said dividing means positioned intermediate said openings so that cooling air from the area adjacent said sidewall portion is diverted into said plurality of plenums and cooling air in individual plenums is drawn into the boundary layer of high temperature gases moving across the exposed surface of said panels, whereby cooling air both impinges upon the interior surface of said panels and flows along the exterior surface thereof.

4. The cooling means of claim 3 wherein said panels are parallel disposed longitudinally extending strips anchored at their forward end to said nozzle, said strips positioned by sliding along opposed surfaces of adjacent dividing means, said openings immediately downstream of said dividing means regular in shape and the remaining openings elongate in shape in the direction of flow of exhaust gases.

5. The cooling means of claim 4 wherein said dividing means are tracks riveted to said nozzle and have opposed flanges extending upstream and downstream respectively with respect to exhaust gases, said strips conform to the surfaces of said flanges adjacent the exhaust gases and are selectively spaced apart to allow for thermal expansion without contact, said means securing together said strips and said plates conform to the surface of said flanges remote from the exhaust gases and are selectively spaced from said tracks to allow for thermal expansion without contact, and said plates are secured to the surface of said securing means remote from said flanges and extend only to the ends of said plates adjacent said tracks.

6. An expandable shield for protecting surfaces exposed to large temperature differentials such as in the exhaust nozzles of gas turbine engines comprising:

heat shield means deployed on the nozzle sidewall and having an external area for collection and distribution of cooler air and an internal area for receiving and selectively releasing said cooler air along a surface directly exposed to exhaust gases, said heat shield means including an inner shield having a plurality of openings for diverting cooler air substantially perpendicular thereto and an outer shield having a plurality of openings for releasing the cooler air into the boundary layer on the surface of said shield means exposed to exhaust gases so that said inner shield is cooled by impingement cooling on one surface and film cooling on the opposite surface; and means secured to the nozzle sidewall for supporting said inner and outer shields in an arrangement which provides spacing so as to avoid warping and distortion of shield components.

7. The expandable shield as defined in claim 6 wherein said means secured to said nozzle wall are a plurality of tracks disposed parallel to one another and adapted to slidably support and position said inner and outer shields;

the edges of said inner and outer shields selectively spaced from said tracks under normal exhaust temperatures to permit transverse expansion at anticipated higher temperatures; and said inner shield secured to said nozzle at the forward end only to permit longitudinal expansion at anticipated higher temperatures.

8. The expandable shield as defined in claim 7 wherein said internal area is divided into a plurality of chambers by said tracks, said outer shields are baffles and the openings therein are circular holes, said inner shields are panels and the openings therein are rectangular holes lesser in number than said circular holes and offset therefrom to assure impingement of cooler air on said panels; and spacer means secured to said panels and contacting said baffles intermediate said holes for forming a plurality of plenums between said baffles and said panels.

9. The expandable shield as defined in claim 8 wherein said spacer means extend transversely across said panels between said tracks; and means securing together respective panels and baffles, said tracks including opposed flanges extending parallel to the nozzle sidewall and said means securing together respective panels and baffles forming grooves in which said flanges are slidably received.

* * * * *